United States Patent
Chuang et al.

(10) Patent No.: US 11,553,276 B2
(45) Date of Patent: Jan. 10, 2023

(54) AUDIO CODEC CIRCUIT

(71) Applicant: REALTEK SEMICONDUCTOR CORP., Hsinchu (TW)

(72) Inventors: Tsung-Peng Chuang, Hsinchu (TW); Cheng-Pin Chang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/155,911

(22) Filed: Jan. 22, 2021

(65) Prior Publication Data

US 2021/0250690 A1    Aug. 12, 2021

(30) Foreign Application Priority Data

Feb. 6, 2020   (TW) .................................. 109103763

(51) Int. Cl.
*G06F 3/16* (2006.01)
*H04R 5/04* (2006.01)

(52) U.S. Cl.
CPC .............. *H04R 5/04* (2013.01); *G06F 3/162* (2013.01); *G06F 3/165* (2013.01)

(58) Field of Classification Search
CPC ............ H04R 5/04; G06F 3/162; G06F 3/165
See application file for complete search history.

(56) References Cited

U.S. PATENT DOCUMENTS

| | | | |
|---|---|---|---|
| 6,173,056 B1* | 1/2001 | Romesburg | H03G 3/007 379/406.01 |
| 6,373,340 B1* | 4/2002 | Shashoua | H03F 1/0244 330/297 |
| 8,115,548 B2* | 2/2012 | Kim | H03F 1/32 330/297 |
| 9,119,159 B2* | 8/2015 | Silverstein | H04M 1/6016 |
| 10,117,035 B2* | 10/2018 | Coenen | H04R 25/43 |
| 2007/0140513 A1* | 6/2007 | Furge | H03G 3/007 381/120 |
| 2008/0192959 A1 | 8/2008 | Lee | |
| 2009/0051423 A1* | 2/2009 | Miaille | H03F 1/0277 330/10 |
| 2011/0249826 A1 | 10/2011 | Van Leest | |
| 2014/0003616 A1 | 1/2014 | Johnson et al. | |
| 2015/0263684 A1* | 9/2015 | Tu | H04R 3/007 381/120 |

* cited by examiner

*Primary Examiner* — Joseph Saunders, Jr.
(74) *Attorney, Agent, or Firm* — Birch, Stewart, Kolasch & Birch, LLP (57) ABSTRACT

An audio codec circuit includes a voltage detecting circuit, an output processing circuit, a digital-to-analog conversion circuit, and an audio amplifying circuit. The voltage detecting circuit is configured to detect an input voltage of an input power. The output processing circuit obtains a first output compensation value according to the input voltage, an output circuit parameter, and a first output spec. The output processing circuit processes a digital audio and compensates the processed audio by the first output compensation value. The digital-to-analog conversion circuit is configured to perform digital-to-analog conversion on the compensated audio to obtain an analog audio. The audio amplifying circuit is configured to amplify the analog audio and output the amplified audio.

13 Claims, 4 Drawing Sheets

AUDIO CODEC CIRCUIT

CROSS-REFERENCE TO RELATED APPLICATION

This non-provisional application claims priority under 35 U.S.C. § 119(a) to Patent Application No. 109103763 filed in Taiwan, R.O.C. on Feb. 6, 2020, the entire contents of which are hereby incorporated by reference.

BACKGROUND

Technical Field

The present disclosure relates to a codec circuit, and in particular, to an audio codec circuit.

Related Art

True wireless stereo earphones refer to earphones without any wire connection among a left ear unit, a right ear unit, and a sound playing host. The sound playing host respectively performs wireless signal transmission with the left ear unit and the right ear unit of the true wireless stereo earphones. For some true wireless stereo earphones, wireless signal transmission may be performed between the left ear unit and the right ear unit, to obtain better sound playing quality and sound receiving quality. For the other true wireless stereo earphones, there is no signal transmission between the left ear unit and the right ear unit.

Regarding the design of the true wireless stereo earphones, a relatively high requirement is imposed on sound playing synchronization and consistency of sound playing volume between two ears. Factors affecting the sound playing volume between the two ears include audio processing consistency between the left ear unit and the right ear unit and sound playing consistency between speakers of the left ear unit and the right ear unit. The point of consistency between the speakers lies in that: a smaller difference between the speakers is better. That is the closer volume produced by the speakers' playing the same analog audios, the better. Regarding the audio processing consistency between the left ear unit and the right ear unit, after the left ear unit and the right ear unit respectively convert the same digital audios into analog audios, the closer analog audios output by the left ear unit and the right ear unit, the better.

SUMMARY

To address the above issue, this disclosure provides an audio codec circuit, which can increase audio processing consistency between a left ear unit and a right ear unit.

According to some embodiments, a wireless and audio codec circuit includes a wireless circuit and an audio codec circuit.

According to some embodiments, an audio codec circuit includes a voltage detecting circuit, an output processing circuit, a digital-to-analog conversion circuit, and an audio amplifying circuit. The voltage detecting circuit is configured to detect an input voltage. The output processing circuit obtains a first output compensation value according to the input voltage, an output circuit parameter, and a first output spec. The output processing circuit processes a digital audio and compensates the processed audio by the first output compensation value. The digital-to-analog conversion circuit is configured to perform digital-to-analog conversion on the compensated audio to obtain an analog audio. The audio amplifying circuit is configured to amplify the analog audio and output the amplified audio.

According to some embodiments, the first output spec is a specification voltage obtained by the output processing circuit according to the input voltage and the output circuit parameter when the input voltage is a standard voltage.

According to some embodiments, the audio codec circuit has a second output compensation value. The second output compensation value is an output comparison value between the amplified analog audio and the digital audio when the input voltage is the standard voltage. The output processing circuit compensates the processed audio by the first output compensation value and the second output compensation value.

According to some embodiments, the audio codec circuit further includes a pre-amplifier circuit, an analog-to-digital conversion circuit, and an input processing circuit. The pre-amplifier circuit is configured to amplify a sound receiving signal. The analog-to-digital conversion circuit is configured to convert the amplified signal into a digital signal. The input processing circuit obtains a first input compensation value according to the input voltage, an input circuit parameter, and a first input spec. The input processing circuit processes the digital signal, compensates the digital signal by the first input compensation value, and outputs the digital signal.

According to some embodiments, the audio codec circuit includes a level generating circuit. The level generating circuit is configured to generate a level voltage according to the input voltage. The audio codec circuit has a second input compensation value. The second input compensation value is an input comparison value between the digital signal and the sound receiving signal when the input voltage is the standard voltage. The input processing circuit compensates the digital signal by the first input compensation value and the second input compensation value. The audio amplifying circuit is configured to amplify the analog audio according to the level voltage and output the amplified analog audio. The digital-to-analog conversion circuit is configured to perform digital-to-analog conversion on the compensated digital audio according to the level voltage to obtain an analog audio.

According to some embodiments, an audio codec circuit includes an output processing circuit, a digital-to-analog conversion circuit, an audio amplifying circuit, a loopback gain circuit, a loopback analog-to-digital conversion circuit, and a correction circuit. The output processing circuit is configured to process a digital audio to be output of the output processing circuit. The digital-to-analog conversion circuit is configured to perform digital-to-analog conversion on the output of the output processing circuit to output an analog audio. The audio amplifying circuit is configured to amplify the analog audio to output an amplified audio. The loopback gain circuit is configured to gain the amplified audio to output a gained audio. The loopback analog-to-digital conversion circuit is configured to perform analog-to-digital conversion on the gained audio to obtain a digital loopback audio. The correction circuit is configured to control the output processing circuit to use a test audio as the output of the output processing circuit, and configured to compare the digital loopback audio and the test audio to obtain a correction compensation value. The correction circuit controls the output processing circuit to compensate the processed digital audio by the correction compensation value, and uses the compensated digital audio as the output of the output processing circuit.

According to some embodiments, the audio codec circuit further includes a control circuit. When being actuated, the control circuit controls the output processing circuit to use the test audio as the output of the output processing circuit, and is configured to cause the correction circuit to compare the digital loopback audio and the test audio to obtain the correction compensation value, control the output processing circuit to compensate the processed digital audio by the correction compensation value, and use the compensated digital audio as the output of the output processing circuit.

According to some embodiments, the audio codec circuit has a second output compensation value. The second output compensation value is an output comparison value between the amplified analog audio and the digital audio when the input voltage is a standard voltage. The output processing circuit compensates the processed digital audio by the correction compensation value and the second output compensation value, and uses the compensated digital audio as the output of the output processing circuit.

According to some embodiments, the audio codec circuit further includes a toggle switch. When the correction circuit controls the output processing circuit to use a test audio as the output of the output processing circuit, the correction circuit simultaneously controls the toggle switch to cause the output of the audio amplifying circuit to be electrically connected to the loopback gain circuit. When the correction circuit controls the output processing circuit to compensate the processed digital audio by the correction compensation value, and uses the compensated digital audio as the output of the output processing circuit, the correction circuit simultaneously controls the toggle switch to cause the output of the audio amplifying circuit to be electrically connected to a speaker.

According to some embodiments, the audio codec circuit further includes a pre-amplifier circuit, an analog-to-digital conversion circuit, and an input processing circuit. The pre-amplifier circuit is configured to amplify a sound receiving signal. The analog-to-digital conversion circuit is configured to convert the amplified signal into a digital signal. The input processing circuit is configured to process the digital signal and output the digital signal after compensating the digital signal by a second input compensation value. The second input compensation value is an input comparison value between the digital signal and the sound receiving signal when the input voltage is the standard voltage.

According to some embodiments, an audio codec circuit includes an output processing circuit, a digital-to-analog conversion circuit, an audio amplifying circuit, a pre-amplifier circuit, an analog-to-digital conversion circuit, an input processing circuit, and a correction circuit. The output processing circuit is configured to process a digital audio to be output of the output processing circuit. The digital-to-analog conversion circuit is configured to perform digital-to-analog conversion on the output of the output processing circuit to output an analog audio. The audio amplifying circuit is configured to amplify the analog audio to output an amplified analog audio. The pre-amplifier circuit is configured to amplify a sound receiving signal. The analog-to-digital conversion circuit is configured to convert the amplified sound receiving signal into a digital signal. The input processing circuit is configured to process the digital signal and output the digital signal. The correction circuit is configured to control the output processing circuit to use a test audio as the output of the output processing circuit, configured to use the amplified analog audio as the sound receiving signal, and configured to compare the digital signal and the test audio to obtain a correction compensation value. The correction circuit controls the output processing circuit to compensate the processed digital audio by the correction compensation value, and uses the compensated digital audio as the output of the output processing circuit.

In conclusion, according to some embodiments, when the audio codec circuits are disposed in the left ear unit and the right ear unit, respectively, audio processing consistency between the left ear unit and the right ear unit can be improved.

DETAILED DESCRIPTION

Figure 1:
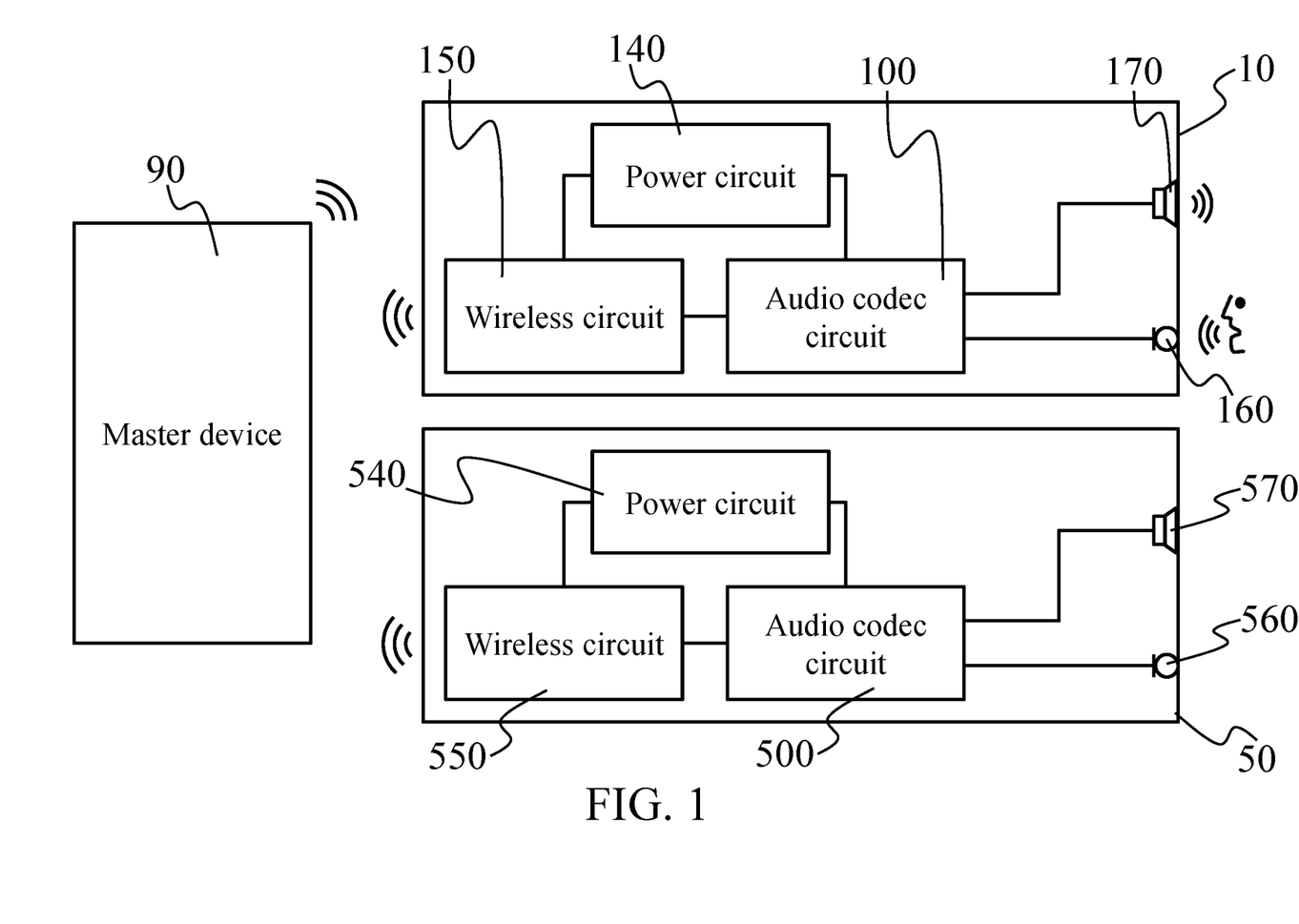
FIG. 1 is a functional block diagram of true wireless stereo earphones and an application thereof according to some embodiments.

FIG. 1 is a functional block diagram of true wireless stereo earphones and an application thereof according to some embodiments. The true wireless stereo earphones include a left ear unit 10 and a right ear unit 50. The left ear unit 10 and the right ear unit 50 communicate with a master device 90 wirelessly. The left ear unit 10 includes a wireless circuit 150, a power circuit 140, an audio codec circuit 100, a speaker 170, and a microphone 160. Similarly, the right ear unit 50 includes a wireless circuit 550, a power circuit 540, an audio codec circuit 500, a speaker 570, and a microphone 560.

In some embodiments, the master device 90 is a device capable of playing sound, for example, an MP3 player, a mobile phone, a notebook computer, a desktop computer, in-car audio-video equipment, a stereo, and karaoke. In some embodiments, the master device 90 is a device capable of receiving sound, for example, a sound recorder, a recording pen, an amplifier, a mobile phone, a notebook computer, a desktop computer, in-car audio-video equipment, a stereo, and karaoke. In some embodiments, the master device 90 is a device capable of playing sound and receiving sound, for example, a mobile phone, a notebook computer, a desktop computer, in-car audio-video equipment, a stereo, and karaoke.

A standard of wireless communication between the master device 90 and the wireless circuit 150 of the left ear unit 10 is the same as a standard of wireless communication between the master device 90 and the wireless circuit 550 of the right ear unit 50. In some embodiments, the master device 90 performs wireless communication with the left ear unit 10 and the right ear unit 50 through Bluetooth. In this example, the wireless circuits 150 and 550 are Bluetooth wireless circuits. The wireless circuits may be, but not limited to, Bluetooth chips (Bluetooth hosts). However, the wireless communication between the master device 90 and the left ear unit 10 and the right ear unit 50 may be other wireless communications protocols. The other wireless communications protocols may be, but not limited to, WiFi and ZigBee. An example in which the wireless circuits 150 and 550 are Bluetooth chips is used. The Bluetooth chip includes a radio frequency (RF) circuit, a modulating circuit, and a baseband circuit (baseband processor).

When playing sound, the master device 90 communicates with the left ear unit 10 and the right ear unit 50 in a wireless communication manner, and transmits a to-be-played audio to the left ear unit 10 and the right ear unit 50. The wireless circuits 150 and 550 and the master device 90 receive and transmit the audio to the audio codec circuits 100 and 500. The audio codec circuits 100 and 500 process the audio and convert the audio into an analog audio, and provide the analog audio to the speakers 170 and 570. The speakers 170 and 570 play the analog audio to produce corresponding sound.

When receiving sound (for example, when a user speaks to the microphones 160, 560), the microphones 160, 560 convert the sound into a sound receiving signal, respectively. The audio codec circuits 100 and 500 convert the sound receiving signal into digital received-sound and transmit the digital received-sound to the wireless circuits 150 and 550, respectively. The wireless circuits 150 and 550 transmit the digital received-sound to the master device 90 through wireless communication.

The power circuits 140 and 540 are configured to supply power to the wireless circuits 150 and 550 and the audio codec circuits 100 and 500. In some embodiments, the power circuits 140 and 540 include a battery and a power management circuit (not shown in the figure).

A structure of the right ear unit 50 is similar to a structure of the left ear unit 10. The left ear unit 10 is used for description below, and details of the part of the right ear unit 50 are not described herein again.

Figure 2:
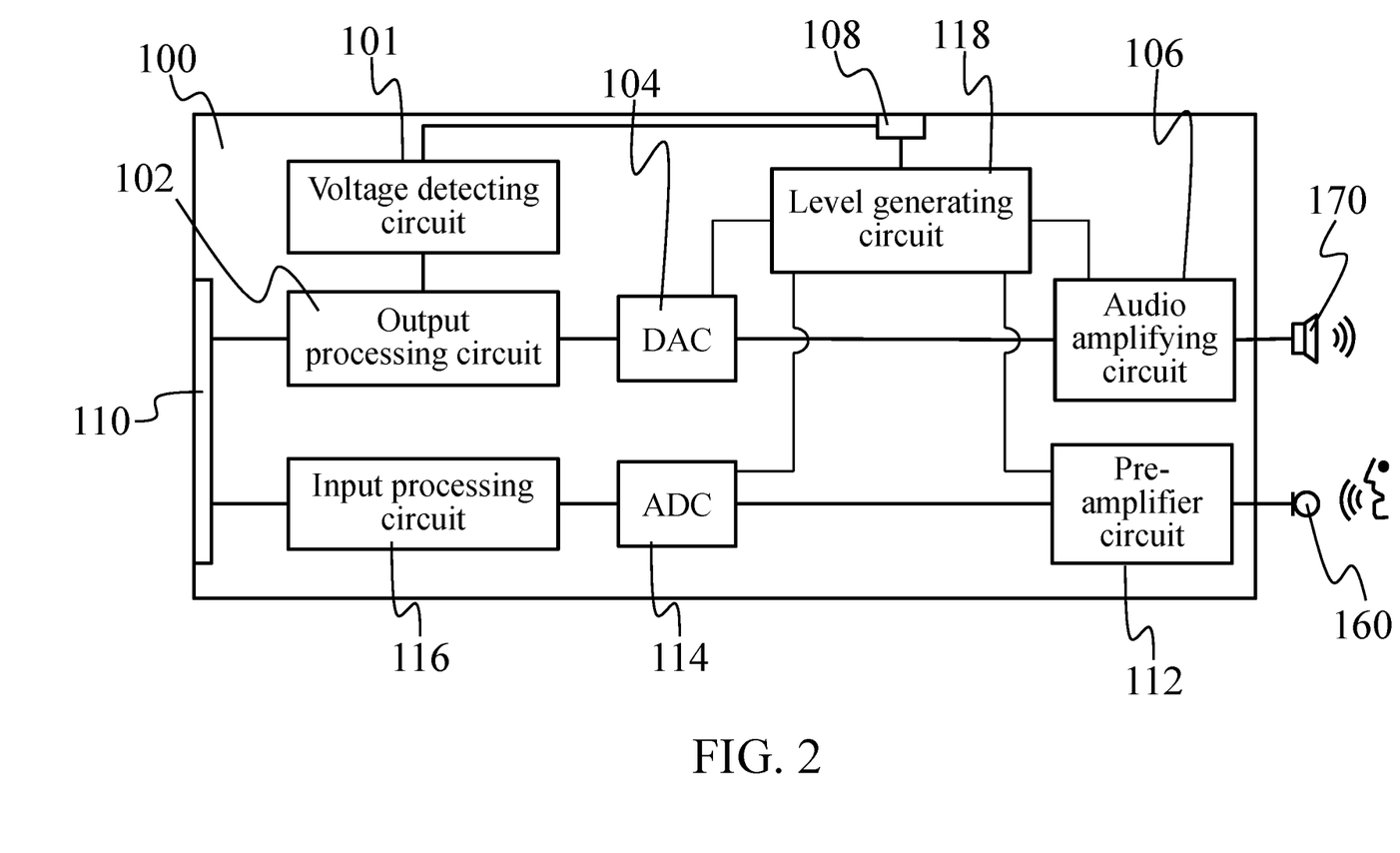
FIG. 2 is a functional block diagram of an audio codec circuit according to some embodiments.

FIG. 2 is a functional block diagram of an audio codec circuit according to some embodiments. The audio codec circuit 100 includes a voltage detecting circuit 101, an output processing circuit 102, a digital-to-analog conversion circuit 104, and an audio amplifying circuit 106. The voltage detecting circuit 101 is configured to detect an input voltage. The output processing circuit 102 obtains a first output compensation value according to the input voltage, an output circuit parameter, and a first output spec. The output processing circuit 102 processes a digital audio and compensates the processed digital audio by the first output compensation value. The digital-to-analog conversion circuit 104 is configured to perform digital-to-analog conversion on the compensated digital audio to obtain an analog audio. The audio amplifying circuit 106 is configured to amplify the analog audio and output the amplified audio.

The audio codec circuit 100 receives power supplied by the power circuit 140. The voltage detecting circuit 101 is configured to detect an input voltage of the power. In some embodiments, the audio codec circuit 100 includes a power input end 108. The power input end 108 is configured to receive the power supplied by the power circuit 140. The voltage detecting circuit 101 is configured to detect the input voltage of the power input end 108.

The digital audio processed by the output processing circuit 102 may be a digital audio from outside of the output processing circuit 102, for example, a digital audio received by a digital interface 110 of the audio codec circuit 100. The embodiment in FIG. 1 is used as an example. The digital audio is from the wireless circuit 150. The output processing circuit 102 processing the digital audio may be, but not limited to, that the output processing circuit 102 equalizing the digital audio, and increasing a sampling (upsampling) frequency of the digital audio. In some embodiments, the output processing circuit 102 may increase the sampling frequency of the digital audio by using an interpolation method. After processing the digital audio, the output processing circuit 102 obtains the processed digital audio.

In some embodiments, the first output spec is an output voltage (may also be referred to as a specification voltage) that is of the audio amplifying circuit 106 and obtained by the output processing circuit 102 according to the output circuit parameter and the standard voltage (namely, the input voltage) when the audio codec circuit 100 is supplied with power with the standard voltage. In some embodiments, a relation between the output circuit parameter Co, the standard voltage Vs, and the output voltage Vo is: Vo=Co*Vs*Di, where Di is the digital audio output by the output processing circuit 102. The output circuit parameter Co is related to design specifications of the digital-to-analog conversion circuit 104 and the audio amplifying circuit 106. Accordingly, the output voltage that is of the audio amplifying circuit 106 and obtained by the output processing circuit 102 according to the output circuit parameter and the standard voltage may also be referred to as the specification voltage. For example, if the standard voltage is 1.8 V, and the output circuit parameter is Co, the output voltage Vo is 1.8*Co*Di, where 1.8Co is the first output spec (the first output spec is the output voltage Vo divided by the digital audio Di output by the output processing circuit 102). In some embodiments, the standard voltage is a rated voltage of the audio codec circuit 100.

The output voltage Vo (namely, an output voltage obtained after being converted by the digital-to-analog conversion circuit 104 and being amplified by the audio amplifying circuit 106) of the audio amplifying circuit 106 is related to the input voltage supplied to the audio codec circuit 100. That is, the output voltage Vo of the audio amplifying circuit 106 is related to an input voltage Vdd obtained through detection by the voltage detecting circuit 101: Vo=Co*Vdd. According to the embodiment in FIG. 1, the audio codec circuit 100 is supplied with power by the power circuit 140. A voltage of the power may vary with time. In some embodiments, the power circuit 140 includes a battery. A voltage of a brand-new battery may be higher than the standard voltage, and the battery voltage may decrease over time of use. Therefore, the output voltage of the audio amplifying circuit 106 changes correspondingly, thereby being different from the first output spec according to design specification. Therefore, the output processing circuit 102 obtains a first output compensation value according to the input voltage Vdd, the output circuit parameter Co, and the first output spec. For example, when the standard voltage is 1.8 V, the first output spec is 1.8Co. When the input voltage Vdd obtained by the voltage detecting circuit 101 is 1.7V, the output voltage of the audio amplifying circuit 106 is 1.7Co. A difference of 0.1Co is generated between the input voltage Vdd and the output voltage. In this case, the output processing circuit 102 obtains the first output compensation value corresponding to the difference value 0.1Co.

Next, the output processing circuit 102 processes the digital audio and compensates the processed audio by the first output compensation value. The example in which the first output compensation value is 0.1Co continues to be used. The output processing circuit 102 compensates the processed digital audio by the first output compensation value of 0.1Co. In this way, the audio codec circuit 100 may compensate a difference of output voltages caused by a difference between the supplied voltage and the standard voltage (may also be referred to as a design voltage). Therefore, for the left ear unit 10 having the audio codec circuit 100 and the right ear unit 50 having the audio codec circuit 500, when there is a difference between voltages supplied by the power circuit 140 and the 540, a difference between output voltages of the audio codec circuit 100 of the left ear unit 10 and the audio codec circuit 500 of the right ear unit 50 will not be generated. That is, when the voltages supplied by the power circuits 140 and 540 are changed, the left ear unit 10 and the right ear unit 50 are still capable of outputting output voltages that are relatively consistent, and the speaker 170 and the speaker 570 corresponding to the left ear unit 10 and the right ear unit 50 can also produce relatively consistent volumes.

The foregoing first output spec may be stored in a memory inside the output processing circuit 102, stored in firmware of the output processing circuit 102, or stored in a memory outside the output processing circuit 102.

The digital-to-analog conversion circuit 104 is configured to perform digital-to-analog conversion on the compensated audio to obtain an analog audio. The digital-to-analog conversion is to convert the digital signal into the analog signal. The audio amplifying circuit 106 (audio amplifier/headphone amplifier) is configured to amplify the analog audio and output an amplified analog audio.

The power input end 108 receives power from the power circuit 140, and supplies the power to all elements inside the audio codec circuit 100. The elements may be, for example, but not limited to, the voltage detecting circuit 101, the output processing circuit 102, the digital-to-analog conversion circuit 104, and the audio amplifying circuit 106.

In some embodiments, the first output spec is a standard voltage of the audio codec circuit 100. The output processing circuit 102 obtains a first output compensation value according to the input voltage Vdd, the output circuit parameter Co, and the first output spec. According to the example described above, when the standard voltage is 1.8V, the output voltage of the audio amplifying circuit is 1.8Co. When the input voltage obtained by the voltage detecting circuit 101 is 1.65V, the output voltage of the audio amplifying circuit is 1.65Co. Therefore, the first output compensation value obtained by the output processing circuit 102 is a compensation value corresponding to 0.15Co (1.8Co–1.65Co).

The output processing circuit 102 compensates the processed digital audio by the first output compensation value, so that the output voltage of the audio amplifying circuit 106 under the input voltage is substantially the same as the output voltage of the audio amplifying circuit 106 under the standard voltage.

It can be learned from the above descriptions that the first output spec may be "the standard voltage of the audio codec circuit 100", or may be "the output voltage that is of the audio amplifying circuit 106 and obtained according to the output circuit parameter and the standard voltage when the audio codec circuit 100 is supplied with power with the standard voltage". When the first output spec is the standard voltage of the audio codec circuit 100, the output processing circuit 102 obtains the first output compensation value according to (Vs−Vdd)*Co.

The audio codec circuit 100 compensates the digital signal according to the first output compensation value, thereby being capable of compensating a difference of the audio codec circuit 100 caused by an input voltage change. Therefore, differences of output analog audios between a plurality of audio codec circuits 100 will not be caused due to an input voltage change.

In some embodiments, the first output compensation value further compensates differences between a plurality of voltage detecting circuits 101 caused by a process drift. Specifically, the voltage detecting circuit 101 is configured to detect the input voltage, and convert the input voltage into a corresponding digital voltage signal. During manufacturing of the voltage detecting circuit 101, differences between a plurality of voltage detecting circuits 101 may be caused due to a process drift. For example, according to design specification, when the voltage detecting circuit 101 detects a voltage of 1.8V, a digital voltage signal corresponding to 1.8V should be output. However, some actual products of the voltage detecting circuit 101 detect a voltage of 1.8V but output a digital voltage signal corresponding to 1.82 V or 1.79 V. In the case, −0.02V (1.8−1.82) or 0.01V (1.8−1.79) is a difference of the voltage detecting circuit 101 caused by the process drift. To compensate the difference caused by the process drift, the first output compensation value further compensates the difference caused by the process.

The difference of the voltage detecting circuit 101 caused by the process drift may be obtained through a calibration machine. Specifically, before the audio codec circuit 100 is shipped out from the factory, the calibration machine tests and reads a digital voltage signal output by the voltage detecting circuit 101. The foregoing example of the first output compensation value continues to be used. The calibration machine provides a standard voltage of 1.8V to the audio codec circuit 100. The calibration machine reads a digital voltage signal 1.78V output by the voltage detecting circuit 101, and obtains a difference 0.02V (1.8−1.78). During operation of the audio codec circuit 100, when the input voltage detected by the voltage detecting circuit 101 is 1.73V, the first output compensation value is 0.05V (1.8−(1.73+0.02)). Therefore, the output processing circuit 102 compensates the digital audio by the first output compensation value (0.05V).

In some embodiments, the audio codec circuit 100 includes a level generating circuit 118. The level generating circuit 118 is configured to generate a level voltage according to the input voltage, and provide the level voltage to the digital-to-analog conversion circuit 104 and the audio amplifying circuit 106. The digital-to-analog conversion circuit 104 performs digital-to-analog conversion on the compensated audio according to the level voltage to obtain the analog audio. The audio amplifying circuit 106 amplifies the analog audio according to the level voltage and output the amplified audio.

In some embodiments, the audio codec circuit 100 has a second output compensation value. The second output compensation value is an output comparison value between the amplified analog audio and the digital audio when the input voltage is the standard voltage. The output processing circuit 102 compensates the processed audio by the first output compensation value and the second output compensation value.

The second output compensation value is configured to compensate differences between a plurality of audio codec circuits 100 generated due to a process drift when the audio codec circuits 100 are being manufactured. The second output compensation value may be obtained by the calibration machine (or a calibration jig, not shown in the figure) before the audio codec circuit 100 is shipped out from the factory. The calibration machine provides power with a standard voltage to the audio codec circuit 100. The calibration machine provides the digital audio to the audio codec circuit 100 through the digital interface 110. Next, the output processing circuit 102 processes the digital audio and compensates the processed audio by the first output compensation value. The digital-to-analog conversion circuit 104 is configured to perform digital-to-analog conversion on the compensated audio to obtain an analog audio. The audio amplifying circuit 106 is configured to amplify the analog audio and output the amplified audio. The calibration machine receives the amplified analog audio, and compares the amplified analog audio with the digital audio, to obtain an output comparison value. For example, the volume of the digital audio is 9 dB. According to design specification, a voltage that is of the amplified analog audio and corresponds to 9 dB is a corresponding voltage. The calibration machine compares the voltage of the amplified analog audio with the corresponding voltage, to obtain the output comparison value. Subsequently, the calibration machine obtains the second output compensation value according to the output comparison value and stores the second output compensation value in the audio codec circuit 100.

The second output compensation value obtained by the calibration machine is used for compensating differences between the digital-to-analog conversion circuit 104, the level generating circuit 118, and the audio amplifying circuit 106 of the audio codec circuit 100 that are caused by a process drift. In addition, the foregoing relation between the output voltage Vo and the input digital audio Di is used for describing an error of the process drift. According to design specification of the audio codec circuit 100, the output circuit parameter thereof is Co. Therefore, the output voltage Vo according to the design specification is Vdd*Co*Di. However, an output circuit parameter of an actual product (audio codec circuit) is Co' due to the process drift, so that an actual output voltage Vo' is Vdd*Co'*Di. There is a difference between Vo and Vo'. Therefore, the calibration machine obtains an actual output voltage of the audio codec circuit 100 under the standard voltage 1.8V, and obtains the second output compensation value. In some embodiments, the second output compensation value A is Vo/Vo'=1.8*Di*Co/(1.8*Di*Co')=Co/Co', and the output processing circuit 102 compensates the digital audio Di to be Di*A by the second output compensation value A. Therefore, an actual output voltage of the audio amplifying circuit 106 is Vdd*Co'*Di*A. A is substituted, and the actual output voltage is Vdd*Co'*Di*(Co/Co')=Vdd*Co*Di. The actual output voltage is an output voltage according to the design specification. In this way, the error between a plurality of audio codec circuits 100 caused by the process drift can be compensated by the second output compensation value.

Because the audio codec circuit 100 is supplied with the power with the standard voltage, the first compensation value is 0. The calibration machine is not affected by the first compensation value during testing and measurement of the corresponding voltage.

Therefore, audio codec circuit 100 subsequently compensates and processes the processed digital audio by the first output compensation value and the second output compensation value. This practice can reduce or eliminate differences between different audio codec circuits 100 caused by a process drift and differences caused by different voltages of power supplied to the audio codec circuits 100, and improve volume consistency of the left ear unit 10 and the right ear unit 50.

The second output compensation value may be stored in a memory inside the audio codec circuit 100, and may be, for example, but not limited to, that the second output compensation value is stored in a memory inside or outside the output processing circuit 102. The second output compensation value may also be stored in firmware of the output processing circuit 102.

In some embodiments, the audio codec circuit 100 further includes a pre-amplifier circuit 112, an analog-to-digital conversion circuit 114, and an input processing circuit 116. The pre-amplifier circuit 112 is configured to amplify a sound receiving signal. The analog-to-digital conversion circuit 114 is configured to convert the amplified signal into a digital signal. The input processing circuit 116 obtains a first input compensation value according to the input voltage, an input circuit parameter, and a first input spec. The input processing circuit processes the digital signal, compensates the digital signal by the first input compensation value, and outputs the digital signal.

Sequences in which the input processing circuit 116 processes the digital signal and compensates the digital signal by the second input compensation value may be exchanged. That is, the input processing circuit 116 first processes the digital signal, and then compensates the processed digital signal by the second input compensation value; or the input processing circuit 116 first compensates the digital signal by the second input compensation value, and then processes the compensated digital signal The sound receiving signal is from the microphone 160. The pre-amplifier circuit (microphone pre-amplifier) 112 is configured to amplify the sound receiving signal. The analog-to-digital conversion circuit 114 is configured to perform analog-to-digital conversion on the amplified signal to obtain the digital signal. The input processing circuit 116 processing the digital signal may be the input processing circuit 116 decreasing a sampling frequency (downsampling) of the digital signal. In some embodiments, the input processing circuit 116 includes a digital decimation filter.

The foregoing first output spec may be stored in a memory inside the input processing circuit 116, stored in firmware of the input processing circuit 116, or stored in a memory outside the input processing circuit 116.

The first input spec has a similar concept as the foregoing first output spec. The first input spec is a corresponding volume of the digital signal that is obtained according to a design specification when the audio codec circuit 100 is supplied with the power with the standard voltage and after the sound receiving signal passes through the pre-amplifier circuit 112 and the analog-to-digital conversion circuit 114. Therefore, the input circuit parameter Ci is related to design specifications of the pre-amplifier circuit 112 and the analog-to-digital conversion circuit 114. In some embodiments, a relation among the input circuit parameter Ci, the standard voltage Vs, and a voltage Vmi of the sound receiving signal is: Vi=Ci*Vmi*Vs, where Vi is a digital signal output by the analog-to-digital conversion circuit 114 to the input processing circuit 116, and Vmi is a voltage obtained when the sound receiving signal from the microphone 160 passes through the pre-amplifier circuit 112. For example, when the standard voltage is 1.8 V, and the input circuit parameter is Ci, the voltage Vi of the digital signal is 1.8*Ci*Vmi. The 1.8*Ci*Vmi is the first input spec.

Similar to the concept of the foregoing first output spec, a relation among the input circuit parameter Ci, the input voltage Vdd, a voltage Vmi of the sound receiving signal, and a digital signal Vi is Vi=Ci*Vdd*Vmi. Therefore, when the voltage of the power supplied to the audio codec circuit 100 by the power circuit 140 is changed, an amplifying result of the pre-amplifier circuit 112 and a conversion effect of the analog-to-digital conversion circuit 114 may also be changed. For example, if the standard voltage is 1.8V, and the first input spec is 1.8Ci. When the input voltage is changed to 1.65V, Vi is changed to 1.65Ci*Vmi, and a difference between Vi and the first input spec is 0.15Ci*Vmi, where 0.15 is a remainder of 1.8−1.65, and the input processing circuit 116 obtains a first input spec corresponding to the difference 0.15Ci*Vmi.

Similar to the first output spec, in some embodiments, the first input spec may be "the standard voltage of the audio codec circuit 100", or may be "a volume of an analog digital output that is obtained according to the input circuit parameter and the standard voltage when the audio codec circuit 100 is supplied with the power with the standard voltage".

Therefore, the input processing circuit 116 obtains the first input compensation value according to the input voltage, the input circuit parameter, and the first input spec. The input processing circuit 116 processes the digital signal, compensates the processed digital signal by the first input compensation value, and outputs the digital signal. The compensated digital signal output by the input processing circuit 116 is output to the wireless circuit 150 through the digital interface 110. The wireless circuit 150 transmits the compensated digital signal to the master device 90 in a wireless communication manner.

It should be noted that the level voltage generated by the level generating circuit 118 is also provided to the analog-to-digital conversion circuit 114 and the pre-amplifier circuit 112.

In some embodiments, the audio codec circuit 100 has a second input compensation value. The second input compensation value is an input comparison value between the digital signal and the sound receiving signal when the input voltage is a standard voltage. The input processing circuit 116 compensates the digital signal by the first input compensation value and the second input compensation value.

Similar to the second output compensation value, the second input compensation value may be obtained by the calibration machine (or a calibration jig, not shown in the figure) through calibration before the audio codec circuit 100 is shipped out from the factory. The calibration machine provides the power with the standard voltage to the audio codec circuit 100 and provides a predetermined sound receiving signal to the pre-amplifier circuit 112. The pre-amplifier circuit 112 amplifies the predetermined sound receiving signal, and the analog-to-digital conversion circuit 114 converts the amplified sound receiving signal into a digital signal. The input processing circuit 116 processes the digital signal and outputs the digital signal after compensating the processed digital signal by the first input compensation value. The calibration machine receives the compensated digital signal from the digital interface 110, and compares the compensated digital signal with the sound receiving signal, to obtain the input comparison value. The calibration machine obtains the second input compensation value according to the input comparison value, and transmits the second input compensation value to the audio codec circuit 100 through the digital interface 110. The audio codec circuit 100 stores the second input compensation value, and the second input compensation value may be stored in the input processing circuit 116. For example, according to a design specification of the audio codec circuit 100, after the audio codec circuit 100 receives and processes the predetermined sound receiving signal, a volume of a digital signal output to the wireless circuit 150 by the audio codec circuit 100 is 9 dB. However, when the calibration is performed by using the calibration machine, a volume of a digital signal output by the audio codec circuit 100 is 8.88 dB, which means that there is a difference of 0.12 dB between the audio codec circuit 100 and the design specification. Therefore, the calibration machine transmits the second input compensation value corresponding to 0.12 dB to the audio codec circuit 100, thereby helping the input processing circuit 116 perform compensation accordingly.

Therefore, audio codec circuit 100 subsequently compensates and processes the processed digital signal by the first input compensation value and the second input compensation value. This practice can remove differences between different audio codec circuits 100 caused by a process drift and differences caused by different voltages of power supplied to the audio codec circuits 100, and improve sound receiving consistency of the left ear unit 10 and the right ear unit 50.

Figure 3:
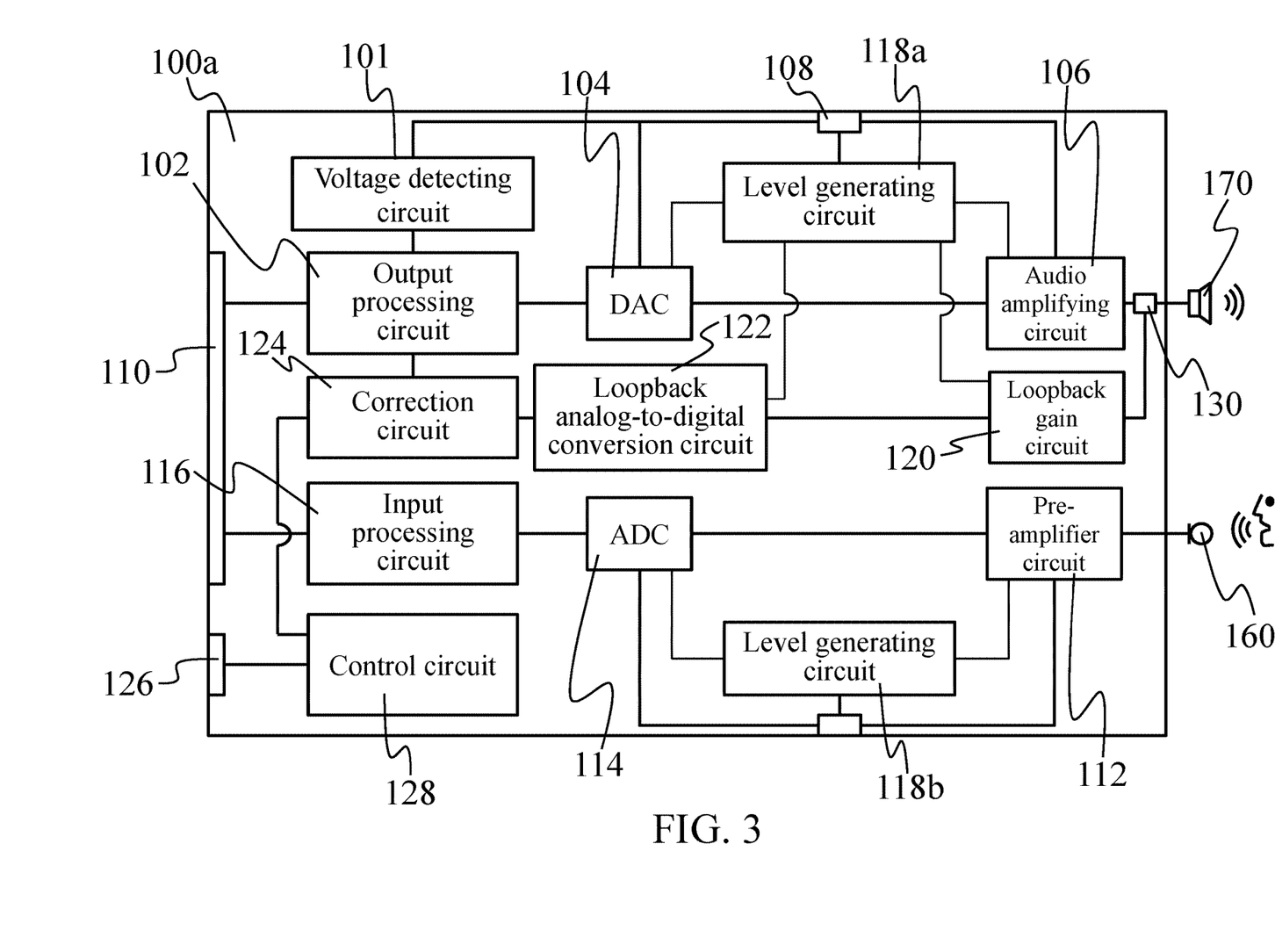
FIG. 3 is a functional block diagram of an audio codec circuit according to some embodiments.

In some embodiments, the calibration machine configured to obtain the second output compensation value may also be performed by a control circuit (as shown in FIG. 3) inside the audio codec circuit 100.

FIG. 3 is a functional block diagram of an audio codec circuit according to some embodiments. The audio codec circuit 100a includes an output processing circuit 102, a digital-to-analog conversion circuit 104, an audio amplifying circuit 106, a loopback gain circuit 120, a loopback analog-to-digital conversion circuit 122, and a correction circuit 124. The output processing circuit 102 is configured to process a digital audio and output the digital audio. The digital-to-analog conversion circuit 104 is configured to perform digital-to-analog conversion on the output of the output processing circuit 102 to output an analog audio. The audio amplifying circuit 106 is configured to amplify the analog audio to output an amplified audio (amplified analog audio). The loopback gain circuit 120 is configured to gain the amplified audio to output a gained audio. The loopback analog-to-digital conversion circuit 122 is configured to perform analog-to-digital conversion on the gained audio to obtain a digital loopback audio. The correction circuit 124 is configured to control the output processing circuit 102 to use a test audio as the output of the output processing circuit 102, and configured to compare the digital loopback audio and the test audio to obtain a correction compensation value. The correction circuit 124 controls the output processing circuit 102 to compensate the processed digital audio by the correction compensation value, and uses the compensated digital audio as the output of the output processing circuit 102.

The digital-to-analog conversion of the digital-to-analog conversion circuit 104 means converting a digital signal into an analog signal. The analog-to-digital conversion of the loopback analog-to-digital conversion circuit means converting an analog signal into a digital signal.

After the test audio passes through the digital-to-analog conversion circuit 104, the audio amplifying circuit 106, the loopback gain circuit 120, and the loopback analog-to-digital conversion circuit 122, theoretically, when the audio codec circuit 100a conforming to the design specification operates when supplied with the power with the standard voltage, the digital loopback audio output by the loopback analog-to-digital conversion circuit 122 should be the same as the test audio. However, a difference between the left ear unit 10 and the right ear unit 50 is caused by a difference between a voltage of power supplied by the power circuit 140 and the standard voltage or caused by other environmental factors (for example, a temperature). Therefore, the digital loopback audio output by the loopback analog-to-digital conversion circuit 122 is different from the test audio. The correction circuit 124 obtains a corresponding correction compensation value according to a difference between the digital loopback audio and the test audio. Hence, the output processing circuit 102 processes the digital audio and compensates the processed digital audio by the correction compensation value. The output processing circuit 102 uses the compensated digital audio as the output of the output processing circuit 102. Subsequently, the audio amplifying circuit 106 amplifies the output (namely, the compensated digital audio) of the output processing circuit 102 to output the amplified audio. In this way, the audio codec circuit 100a can compensate the difference between voltages of power supplied by the power circuit 140 and a difference that is between the audio codec circuits 100a of the left ear unit 10 and the right ear unit 50 and that is caused by other environmental changes.

In some embodiments, during initialization (that is, being initially supplied with power) of the audio codec circuit 100a, the correction circuit 124 performs the foregoing operation of the test audio, and obtains the correction compensation value. Subsequently, the output processing circuit 102 processes the digital audio and compensates the processed digital audio by the correction compensation value.

In some embodiments, the audio codec circuit 100a further includes a control interface 126 and a control circuit 128. When being actuated, the control circuit 128 controls the output processing circuit 102 to use the test audio as the output of the output processing circuit 102, causes the correction circuit 124 to compare the digital loopback audio and the test audio to obtain the correction compensation value, controls the output processing circuit 102 to compensate the processed digital audio by the correction compensation value, and uses the compensated digital audio as the output of the output processing circuit 102. The control circuit 128 is actuated when receiving a command from the control interface 126. The wireless circuit 150 or the calibration machine interprets the command received through the control interface 126 and actuates the control circuit 128 accordingly.

In some embodiments, during initialization of the audio codec circuit 100a, the control circuit 128 controls the correction circuit 124 to perform the foregoing operation of the test audio, and obtain the correction compensation value. In some embodiments, the control circuit 128 periodically controls the correction circuit 124 to perform the foregoing operation of the test audio, and obtain the correction compensation value. A length of the periodical time is determined according to design specifications. The period may be, but not limited to, every hour, every two hours, every three hours, and the like. In some embodiments, the control circuit 128 non-periodically controls the correction circuit 124 to perform the foregoing operation of the test audio, and obtain the correction compensation value. For example, when the audio codec circuit 100a has not received any digital audio from the digital interface 110, the control circuit 128 controls the correction circuit 124 to perform the foregoing operation of the test audio, and obtain the correction compensation value. The digital interface 110 is suitable for receiving the digital audio from outside of the audio codec circuit 100a. The digital audio may be, for example, but not limited to, a digital audio from the wireless circuit 150.

There are several implementations for that the correction circuit 124 controls the output processing circuit 102 to use a test audio as the output of the output processing circuit 102. The implementations may be, for example, but not limited to, the following examples. 1: The correction circuit 124 controls the output processing circuit 102, and the output processing circuit 102 generates the test audio. 2: The correction circuit 124 generates and transmits the test audio to the output processing circuit 102, and the output processing circuit 102 outputs the test audio. 3: The calibration machine (not shown in the figure) gives a command to the control circuit 128 through the control interface 126, to correspondingly control the correction circuit 124 and the output processing circuit 102. The calibration machine inputs the test audio through the digital interface 110, and simultaneously controls the output processing circuit 102 by using the control circuit 128, to directly use the test audio as the output of the output processing circuit 102. Next, the calibration machine controls the correction circuit 124 to compare the digital loopback audio and the test audio to obtain the correction compensation value. 4: The calibration machine transmits a preset audio to the output processing circuit 102 through the digital interface 110. The default audio may form the test audio after being processed by the output processing circuit 102. Therefore, the output processing circuit 102 may output the test audio. Next, the calibration machine controls the correction circuit 124 to compare the digital loopback audio and the test audio to obtain the correction compensation value.

Referring to FIG. 3, in some embodiments, the audio codec circuit 100a further includes a toggle switch 130. When the correction circuit 124 controls the output processing circuit 102 to use a test audio as the output of the output processing circuit 102, the correction circuit 124 simultaneously controls the toggle switch 130 to cause the output of the audio amplifying circuit 106 to be electrically connected to the loopback gain circuit 120. When the correction circuit 124 controls the output processing circuit 102 to compensate the processed digital audio by the correction compensation value, and uses the compensated digital audio as the output of the output processing circuit 102, the correction circuit 124 simultaneously controls the toggle switch 130 to cause the output of the audio amplifying circuit 106 to be electrically connected to the speaker 170.

In some embodiments, the audio codec circuit 100a further includes a pre-amplifier circuit 112, an analog-to-digital conversion circuit 114, and an input processing circuit 116. The pre-amplifier circuit 112 is configured to amplify a sound receiving signal. The analog-to-digital conversion circuit 114 is configured to convert the amplified signal into a digital signal. The input processing circuit 116 is configured to process the digital signal and output the digital signal after compensating the digital signal by a second input compensation value. The second input compensation value is an input comparison value between the digital signal and the sound receiving signal when the input voltage is the standard voltage. Sequences in which the input processing circuit 116 processes the digital signal and compensates the digital signal by the second input compensation value may be exchanged. That is, the input processing circuit 116 first processes the digital signal, and then compensates the processed digital signal by the second input compensation value; or the input processing circuit 116 first compensates the digital signal by the second input compensation value, and then processes the compensated digital signal In some embodiments, the audio codec circuit 100a includes a plurality of level generating circuits 118a and 118b. The level generating circuits 118a and 118b are configured to generate a level voltage according to the input voltage, and provide the level voltage to the digital-to-analog conversion circuit 104, the audio amplifying circuit 106, the loopback gain circuit 120, the loopback analog-to-digital conversion circuit 122, the pre-amplifier circuit 112, and the analog-to-digital conversion circuit 114. The digital-to-analog conversion circuit 104 performs digital-to-analog conversion on the compensated audio according to the level voltage to obtain an analog audio. The audio amplifying circuit 106 amplifies the analog audio according to the level voltage and output the amplified audio. The loopback gain circuit 120 gains the amplified audio according to the level voltage to output a gained audio. The loopback analog-to-digital conversion circuit 122 performs analog-to-digital conversion on the gained audio according to the level voltage to obtain a digital loopback audio. The audio amplifying circuit 112 amplifies the sound receiving signal according to the level voltage. The analog-to-digital conversion circuit 114 converts the amplified signal into the digital signal according to the level voltage.

Figure 4:
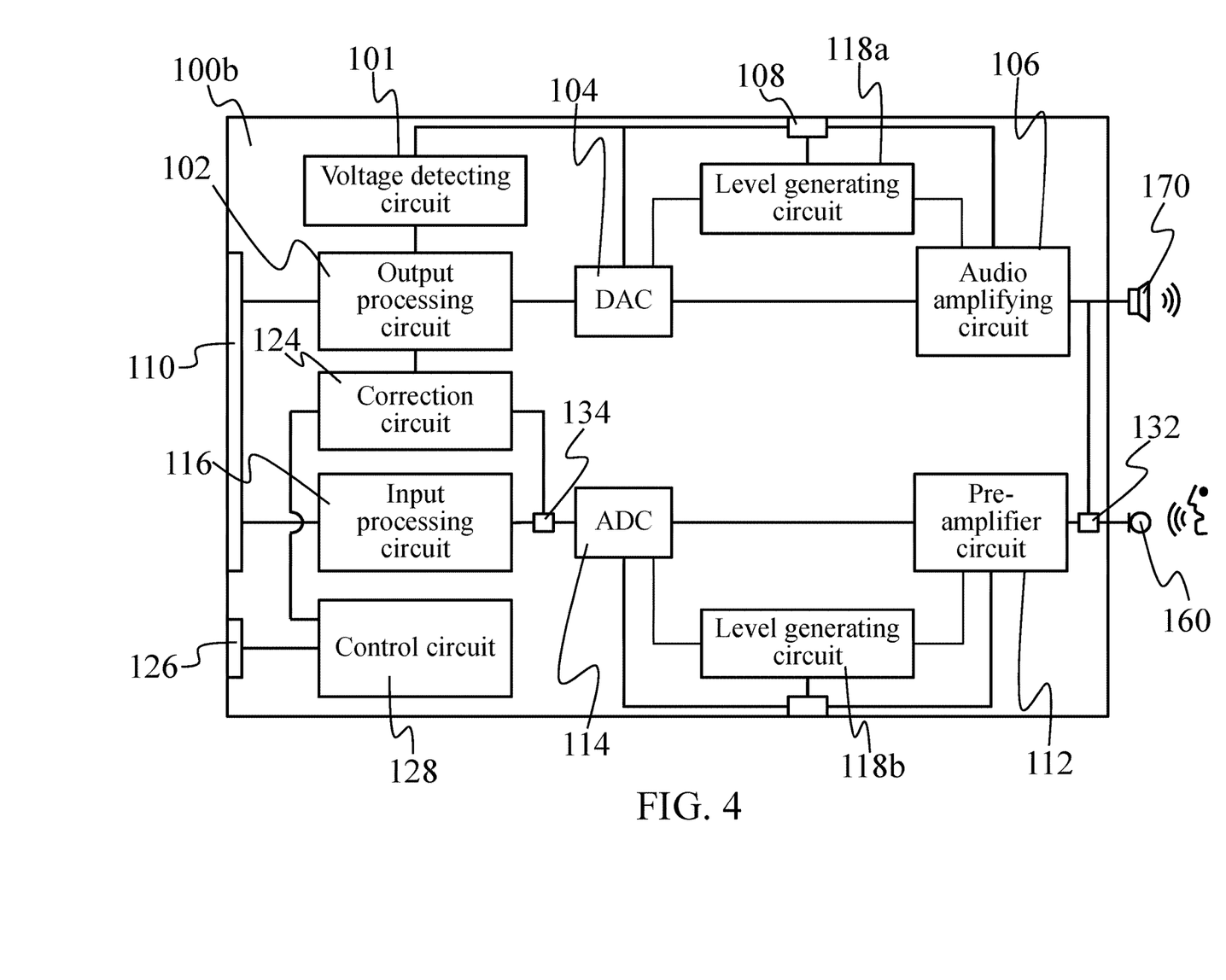
FIG. 4 is a functional block diagram of an audio codec circuit according to some embodiments.

FIG. 4 is a functional block diagram of an audio codec circuit according to some embodiments. The audio codec circuit 100b includes an output processing circuit 102, a digital-to-analog conversion circuit 104, an audio amplifying circuit 106, a pre-amplifier circuit 112, an analog-to-digital conversion circuit 114, an input processing circuit 116, and a correction circuit 124. The output processing circuit 102 is configured to process a digital audio and output the digital audio. The digital-to-analog conversion circuit 104 is configured to perform digital-to-analog conversion on the output of the output processing circuit 102 to output an analog audio. The audio amplifying circuit 106 is configured to amplify the analog audio to output an amplified analog audio. The pre-amplifier circuit 112 is configured to amplify a sound receiving signal. The analog-to-digital conversion circuit 114 is configured to convert the amplified sound receiving signal into a digital signal. The input processing circuit 116 is configured to process the digital signal and output the digital signal. The correction circuit 124 is configured to control the output processing circuit 102 to use a test audio as the output of the output processing circuit 102, configured to use the amplified analog audio as the sound receiving signal, and configured to compare the digital signal and the test audio to obtain a correction compensation value. The correction circuit 124 controls the output processing circuit 102 to compensate the processed digital audio by the correction compensation value, and uses the compensated digital audio as the output of the output processing circuit.

The output processing circuit 102 may compensate, by using compensation of the correction compensation value, a difference between the left ear unit 10 and the right ear unit 50 caused by a difference between a voltage of power supplied by the power circuit 140 and the standard voltage or other environmental factors (for example, a temperature).

The embodiment in FIG. 4 is similar to the embodiment in FIG. 3. In the embodiment in FIG. 4 during a calibration period, the correction circuit 124 controls the output processing circuit 102 to use the test audio as the output of the output processing circuit 102, causes the amplified analog audio output by the audio amplifying circuit 106 to be used as the sound receiving signal, and provides the sound receiving signal to the pre-amplifier circuit 112. The pre-amplifier circuit 112 amplifies the sound receiving signal, and the analog-to-digital conversion circuit 114 converts the amplified sound receiving signal into the digital signal. Next, the correction circuit 124 compares the digital signal and the test audio to obtain the correction compensation value. In this way, compared with the embodiment in FIG. 3, in the embodiment in FIG. 4, there is no need to dispose the loopback gain circuit 120 and the loopback analog-to-digital conversion circuit 122 of the audio codec circuit 110a in FIG. 3 in the audio codec circuit 100b in FIG. 4. The circuit of the audio codec circuit 100b in FIG. 4 is more simplified and has lower costs.

In some embodiments, the audio codec circuit 100b further includes a toggle switch 132 and a toggle switch 134. When the correction circuit 124 controls the output processing circuit 102 to use the test audio as the output of the output processing circuit 102, the correction circuit 124 simultaneously controls the toggle switch 132 and the toggle switch 134 to cause the output of the audio amplifying circuit 106 to be electrically connected to the pre-amplifier circuit 112. When the correction circuit 124 controls the output processing circuit 102 to compensate the processed digital audio by the correction compensation value, and uses the compensated digital audio as the output of the output processing circuit 102, the correction circuit 124 simultaneously controls the toggle switch 132 and the toggle switch 134 to cause the output of the audio amplifying circuit 106 to be electrically connected to the speaker 170.

In some embodiments, the audio codec circuit 100b has a second output compensation value. The second output compensation value is an output comparison value between the amplified analog audio and the digital audio when the input voltage is a standard voltage. The output processing circuit 102 compensates the processed digital audio by the correction compensation value and the second output compensation value, and uses the compensated digital audio as the output of the output processing circuit 102.

In some embodiments, the audio codec circuit 100b has a second input compensation value. The second input compensation value is an input comparison value between the digital signal and the sound receiving signal when the input voltage is the standard voltage. The input processing circuit 116 compensates the processed digital signal by the second input compensation value, and uses the compensated digital audio as the output of the input processing circuit 116.

In some embodiments, the audio codec circuit 100b further includes a digital interface 110 and a plurality of level generating circuits 118a and 118b. In some embodiments, the audio codec circuit 100b further includes a control circuit 128 and a control interface 126. The digital interface 110, the level generating circuits 118a and 118b, the control circuit 128, and the control interface 126 are similar to the corresponding circuits in FIG. 3. Details are not described herein again.

Referring to FIG. 1, in some embodiments, a wireless and audio codec circuit (may also be referred to as a wireless and audio codec chip or a wireless and audio codec integrated chip) includes a wireless circuit 150 and an audio codec circuit 100. The audio codec circuit 100 in the wireless and audio codec circuit may be any one of the audio codec circuit 100 in FIG. 2, the audio codec circuit 100a in FIG. 3, or the audio codec circuit 100b in FIG. 4.

In conclusion, according to some embodiments, when the audio codec circuit is configured in the left ear unit and the right ear unit, audio processing consistency between the left ear unit and the right ear unit can be improved.

What is claimed is:
1. An audio codec circuit, comprising:
  a voltage detecting circuit, configured to detect an input voltage;
  an output processing circuit, wherein the output processing circuit obtains a first output compensation value according to the input voltage, an output circuit parameter, and a first output spec, and the output processing circuit processes a digital audio and compensates the processed digital audio by the first output compensation value;
  a digital-to-analog conversion circuit, configured to perform digital-to-analog conversion on the compensated digital audio to obtain an analog audio; and an audio amplifying circuit, configured to amplify the analog audio and output an amplified analog audio;

wherein the output circuit parameter is related to the digital-to-analog conversion circuit and the audio amplifying circuit.

2. The audio codec circuit according to claim 1, wherein the output processing circuit processing the digital audio is equalizing the digital audio and increasing a sampling frequency of the digital audio.

3. The audio codec circuit according to claim 1, wherein the first output spec is a specification voltage obtained by the output processing circuit according to the input voltage and the output circuit parameter when the input voltage is a standard voltage.

4. The audio codec circuit according to claim 3, wherein the audio codec circuit comprises a level generating circuit, the level generating circuit is configured to generate a level voltage according to the input voltage; the audio codec circuit has a second output compensation value, the second output compensation value is an output comparison value between the amplified analog audio and the digital audio when the input voltage is the standard voltage; the output processing circuit compensates the processed digital audio by the first output compensation value and the second output compensation value; the audio amplifying circuit is configured to amplify the analog audio according to the level voltage and output the amplified analog audio; and the digital-to-analog conversion circuit is configured to perform digital-to-analog conversion on the compensated digital audio according to the level voltage to obtain the analog audio.

5. The audio codec circuit according to claim 4, further comprising:

a pre-amplifier circuit, configured to amplify a sound receiving signal;

an analog-to-digital conversion circuit, configured to convert the amplified signal into a digital signal; and an input processing circuit, obtaining a first input compensation value according to the input voltage, an input circuit parameter, and a first input spec, wherein the input processing circuit processes the digital signal, compensates the digital signal by the first input compensation value, and outputs the digital signal.

6. The audio codec circuit according to claim 5, wherein the audio codec circuit has a second input compensation value, the second input compensation value is an input comparison value between the digital signal and the sound receiving signal when the input voltage is the standard voltage, and the input processing circuit compensates the digital signal by the first input compensation value and the second input compensation value.

7. The audio codec circuit according to claim 6, further comprising a digital interface, wherein the digital interface is suitable for receiving the digital audio from outside and outputting the processed digital signal.

8. The audio codec circuit according to claim 1, further comprising:

a pre-amplifier circuit, configured to amplify a sound receiving signal;

an analog-to-digital conversion circuit, configured to convert the amplified signal into a digital signal; and an input processing circuit, obtaining a first input compensation value according to the input voltage, an input circuit parameter, and a first input spec, wherein the input processing circuit processes the digital signal, compensates the digital signal by the first input compensation value, and outputs the digital signal, wherein the audio codec circuit has a second input compensation value, wherein the second input compensation value being an input comparison value between the digital signal and the sound receiving signal when the input voltage is a standard voltage, and the input processing circuit compensates the digital signal by the first input compensation value and the second input compensation value.

9. An audio codec circuit, comprising:

a voltage detecting circuit, configured to detect an input voltage;

an output processing circuit, wherein the output processing circuit obtains a first output compensation value according to the input voltage, an output circuit parameter, and a first output spec, and the output processing circuit processes a digital audio and compensates the processed digital audio by the first output compensation value;

a digital-to-analog conversion circuit, configured to perform digital-to-analog conversion on the compensated digital audio to obtain an analog audio; and an audio amplifying circuit, configured to amplify the analog audio and output an amplified analog audio;

wherein the audio codec circuit comprises a level generating circuit, the level generating circuit is configured to generate a level voltage according to the input voltage; the audio codec circuit has a second output compensation value, the second output compensation value is an output comparison value between the amplified analog audio and the digital audio when the input voltage is the standard voltage; the output processing circuit compensates the processed digital audio by the first output compensation value and the second output compensation value; the audio amplifying circuit is configured to amplify the analog audio according to the level voltage and output the amplified analog audio; and the digital-to-analog conversion circuit is configured to perform digital-to-analog conversion on the compensated digital audio according to the level voltage to obtain the analog audio.

10. The audio codec circuit according to claim 9, further comprising:

a pre-amplifier circuit, configured to amplify a sound receiving signal;

an analog-to-digital conversion circuit, configured to convert the amplified signal into a digital signal; and an input processing circuit, obtaining a first input compensation value according to the input voltage, an input circuit parameter, and a first input spec, wherein the input processing circuit processes the digital signal, compensates the digital signal by the first input compensation value, and outputs the digital signal.

11. The audio codec circuit according to claim 10, wherein the audio codec circuit has a second input compensation value, the second input compensation value is an input comparison value between the digital signal and the sound receiving signal when the input voltage is the standard voltage, and the input processing circuit compensates the digital signal by the first input compensation value and the second input compensation value.

12. The audio codec circuit according to claim 11, further comprising a digital interface, wherein the digital interface is suitable for receiving the digital audio from outside and outputting the processed digital signal.

13. An audio codec circuit, comprising:

a voltage detecting circuit, configured to detect an input voltage;

an output processing circuit, wherein the output processing circuit obtains a first output compensation value according to the input voltage, an output circuit parameter, and a first output spec, and the output processing circuit processes a digital audio and compensates the processed digital audio by the first output compensation value;
a digital-to-analog conversion circuit, configured to perform digital-to-analog conversion on the compensated digital audio to obtain an analog audio;
an audio amplifying circuit, configured to amplify the analog audio and output an amplified analog audio;
a pre-amplifier circuit, configured to amplify a sound receiving signal;
an analog-to-digital conversion circuit, configured to convert the amplified signal into a digital signal; and
an input processing circuit, obtaining a first input compensation value according to the input voltage, an input circuit parameter, and a first input spec, wherein the input processing circuit processes the digital signal, compensates the digital signal by the first input compensation value, and outputs the digital signal, wherein the audio codec circuit has a second input compensation value, wherein the second input compensation value being an input comparison value between the digital signal and the sound receiving signal when the input voltage is a standard voltage, and the input processing circuit compensates the digital signal by the first input compensation value and the second input compensation value.

\* \* \* \* \*